US006724379B2

(12) United States Patent
Markis

(10) Patent No.: US 6,724,379 B2
(45) Date of Patent: Apr. 20, 2004

(54) MULTICHANNEL DRIVER CIRCUIT FOR A SPATIAL LIGHT MODULATOR AND METHOD OF CALIBRATION

(75) Inventor: William R. Markis, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 207 days.

(21) Appl. No.: 09/877,893

(22) Filed: Jun. 8, 2001

(65) Prior Publication Data

US 2002/0196245 A1 Dec. 26, 2002

(51) Int. Cl.[7] ............................ G09G 5/00; G02F 1/03; G02F 1/07

(52) U.S. Cl. ........................ 345/209; 345/694; 359/249

(58) Field of Search ................................. 345/209, 694, 345/698; 359/249

(56) References Cited

U.S. PATENT DOCUMENTS

| | | | | | |
|---|---|---|---|---|---|
| 4,636,039 | A | | 1/1987 | Turner | |
| 4,683,420 | A | * | 7/1987 | Goutzoulis | 324/96 |
| 5,448,749 | A | * | 9/1995 | Kyuma et al. | 700/286 |
| 5,719,682 | A | * | 2/1998 | Venkateswar | 358/3.01 |
| 5,990,982 | A | * | 11/1999 | Gove et al. | 348/750 |
| 6,014,202 | A | | 1/2000 | Chapnik et al. | |
| 6,184,852 | B1 | * | 2/2001 | Millward et al. | 345/84 |
| 6,188,427 | B1 | | 2/2001 | Anderson et al. | |
| 6,233,084 | B1 | * | 5/2001 | Owen et al. | 359/247 |
| 6,479,811 | B1 | * | 11/2002 | Kruschwitz et al. | 250/237 G |

* cited by examiner

*Primary Examiner*—Richard Hjerpe
*Assistant Examiner*—M. Fatahiyar
(74) *Attorney, Agent, or Firm*—Nelson Adrian Blish

(57) ABSTRACT

An apparatus and method for calibration of each individual driver channel in a multichannel driver circuit for a spatial light modulator used in an image display apparatus. A separate calibration sequence is initiated in which, for each positive and negative half-cycle of the driver circuit, a ramped voltage, applied as the drive circuit voltage (18), is compared against a standard black-video drive voltage. When the ramped voltage equals the standard drive voltage, calibration for this half-cycle is complete and a digital value corresponding to a correction component of the ramped voltage is stored in memory (40). The process is duplicated for each positive and negative half-cycle of the drive voltage signal (18). For gain calibration, a ramped voltage is applied as the drive circuit voltage 18 and compared against a standard white-video signal level. When the ramped voltage equals the standard white-video signal level, gain calibration is computed and the digital value for gain correction is stored in memory (40). Display driver voltages are thereby calibrated so that, for each driver channel, the spatial light modulator is presented with a substantially equal black-video level and a controllable white-video level.

10 Claims, 6 Drawing Sheets

MULTICHANNEL DRIVER CIRCUIT FOR A SPATIAL LIGHT MODULATOR AND METHOD OF CALIBRATION

FIELD OF THE INVENTION

This invention generally relates to a multichannel image display apparatus and more particularly to an apparatus and method for equalizing drive voltage provided over multiple channels to a spatial light modulator.

BACKGROUND OF THE INVENTION

Spatial Light Modulator (SLM) devices are increasingly being used in a wide range of imaging applications such as digital projection and printing. Typical spatial light modulators include devices such as Liquid Crystal Devices (LCDs) and digital micro-mirror devices (DMDs). A spatial light modulator comprises a two-dimensional array of modulator sites that operate upon incident light in order to form a two-dimensional image. LCD devices use light polarization characteristics in order to modulate each light pixel in the array. DMD devices use an array of tiny micro-mirrors to modulate individual light pixels. Each pixel in a spatial light modulator array is capable of exhibiting a variable light intensity in response to a corresponding variable analog voltage level.

In operation, analog image data is provided to the spatial light modulator array in a sequential scan, with analog voltages provided for a block of successive pixels at one time. For example, a typical LCD device is designed to accept a 16-pixel block of analog voltages at a time, as corresponding drive voltages for 16 pixels. Repeated delivery of analog drive voltages, 16 channels at a time, drives the LCD spatial light modulator so that a complete array containing thousands of pixels can be refreshed several times per second in order to provide successive frames of image data at a refresh rate required for motion picture imaging.

For an array containing many thousands of pixels, it can be appreciated that there will be variations in response between pixels. Without correction in some form, differences in pixel response can cause patterning, streaking, and a number of related undesirable image anomalies. Where such differences are a result of drive voltage variations, undesirable patterning image anomalies can be particularly pronounced, degrading the imaging performance of a projector apparatus.

A number of methods have been used to adjust for pixel-to-pixel variations in order to calibrate the spatial light modulator so that a more uniform response can be provided. A conventional approach for spatial light modulator calibration is to measure the light output of each individual pixel component, given a standard input signal level. An illustration of this method is disclosed, for example, in U.S. Pat. No. 6,188,427 (Anderson et al.) in which an automated calibration system is provided for an array of light-emitting elements. Correction values for zones of pixels are stored in a look-up table (LUT) for use during printing operation. Similarly, U.S. Pat. No. 6,014,202 (Chapnik et al.) discloses a spatial light modulator calibration method that measures light intensity output from a spatial light modulator and compensates by adjusting drive voltage. A number of patents disclose methods for compensating for weak or otherwise defective pixels and for correcting for fringe effects and near-neighbor pixel interaction, such as U.S. Pat. No. 4,636,039 (Turner) and U.S. Pat. No. 5,719,682 (Venkateswar).

While conventional methods are useful in profiling the pixel-by-pixel response of a spatial light modulator and in compensating for pixel-by-pixel variation, there are some drawbacks to these methods. Notably, conventional methods that measure light output attempt to correct for differences only at the spatial light modulator itself. However, there may be underlying causes that would be better corrected earlier in the imaging signal chain, not at the spatial light modulator itself. Specifically, variations in channel driver input voltages will potentially have a much more pronounced effect on output image quality that will variations in pixel-to-pixel response. For example, in an imaging system where an LCD has a 16-channel input driver, one or more of these input channels may be weak. This would cause every $16^{th}$ pixel to be driven at a lower voltage level, resulting in objectionable streaking or patterning in the output image.

Channel-to-channel differences can also develop over time, as components age. Thus, conventional manual methods for channel equalization, using potentiometer adjustment, have limitations with respect to cost and practicality. An alternate approach, using only high-precision electronic components can be costly and may not adequately solve the problem of providing equalized channel driver voltages. Therefore, it can be seen that there is a need for an automated method for driver channel equalization in a multichannel imaging apparatus using a spatial light modulator.

SUMMARY OF THE INVENTION

It is an object of the present invention to provide a multichannel driver circuit for controlling each of a plurality of channels of a spatial light modulator, the circuit comprising:

(a) a control logic processor for providing as output for each channel, a digital pixel value based on input image data and digital calibration data;

(b) a reference voltage and correction generator that provides as output for all channels a positive half-cycle reference voltage and a negative half-cycle reference voltage, and that provides as output for each channel, based on said digital calibration data:

(b1) a gain compensation value;

(b2) a positive half-cycle correction voltage; and, (b3) a negative half-cycle correction voltage;

(c) for each channel, a channel signal generator for accepting as input said digital pixel value and said gain compensation value and for providing as output a conditioned gain analog pixel voltage;

(d) for each channel, a flipper circuit for accepting as input said conditioned gain analog pixel voltage, said positive half-cycle reference voltage, said positive half-cycle correction voltage, said negative half-cycle reference voltage, and said negative half-cycle correction voltage and for providing, as output:

(d1) a positive half-cycle pixel driver output voltage obtained by conditioning said positive half-cycle reference voltage by said positive half-cycle correction voltage and summing the result with said conditioned gain analog pixel voltage;

(d2) a negative half-cycle pixel driver output voltage obtained by conditioning said negative half-cycle reference voltage by said negative half-cycle correction voltage and summing the result with the additive inverse of said conditioned gain analog pixel voltage;

(e) a comparator for performing the following operations for each channel:

(e1) sampling said positive half-cycle pixel driver output voltage from said flipper circuit and providing a first output signal to said control logic processor indicative that said positive half-cycle pixel driver output voltage is substantially equal to said positive half-cycle reference voltage;

(e2) sampling said negative half-cycle pixel driver output voltage from said flipper circuit and providing a second output signal to said control logic processor indicative that said negative half-cycle pixel driver output voltage is substantially equal to said negative half-cycle reference voltage.

According to another aspect, the present invention provides an imaging system that uses a spatial light modulator having a plurality of signal channels, wherein an apparatus for obtaining a channel correction signal for calibrating each channel comprises:

(a) for all channels, a standard signal generator for providing a standard reference video black-level signal;

(b) a channel correction signal generator for generating, for each of said plurality of signal channels, a channel correction signal corresponding to a digital input value;

(c) a comparator for comparing a summed signal comprising said channel correction signal and a channel video black-level signal against said standard reference video black-level signal, and for providing a comparator output signal indicative that said summed signal is equal to said standard reference video black-level signal;

(d) a multiplexer for selectively switching said summed signal to said comparator, based on a channel selector signal;

(e) a control logic processor for providing said channel selector signal to said multiplexer, for accepting said comparator output signal, and for executing a control program that obtains said channel correction signal for each channel and stores said channel correction signal in a memory.

Another embodiment of the present invention provides, in an image display apparatus employing a plurality of channel drivers for a spatial light modulator having a plurality of channels, a method for calibration of each individual channel driver, the method comprising:

(a) over the positive half-cycle of a drive signal for said each individual channel, obtaining a positive channel correction signal by iteratively comparing a positive summed channel driver signal, said positive summed channel driver signal comprising a positive black-video channel driver signal added to a positive channel correction signal, against a positive standard signal and incrementing said positive channel correction signal until said positive summed channel driver signal equals said positive standard signal, at which time said positive channel correction signal is stored;

(b) over the negative half-cycle of a drive signal for said each individual channel, obtaining a negative channel correction signal by iteratively comparing a negative summed channel driver signal, said negative summed channel driver signal comprising a negative black-video channel driver signal added to a negative channel correction signal, against a negative standard signal and incrementing said negative channel correction signal until said negative summed channel driver signal equals said negative standard signal, at which time said negative channel correction signal is stored;

(c) obtaining a gain level by iteratively comparing a channel white-level signal against a standard white-level signal and incrementing a gain signal, until said channel white-level signal equals said standard white-level signal, at which time said gain signal is stored;

wherein said positive channel correction signal, said negative channel correction signal, and said gain signal serve to calibrate said each individual channel driver.

A feature of the present invention is an automated sequence for multichannel calibration available upon command. This sequence can be automatically initiated at equipment power-up or used whenever necessary to maintain equipment performance over time and compensate for possible component drift.

It is an advantage of the present invention that it provides a method for equalizing driver signal levels that is inherently adaptable to modular component design. The present invention allows replacement of a spatial light modulator component, for example, where the only additional calibration needed would be for the spatial light modulator component itself.

It is an advantage of the present invention that it provides circuitry and logic commands that allow automated channel driver calibration without need of additional instrumentation.

It is a further advantage of the present invention that it provides method for device calibration that is direct, and is less expensive than conventional methods that measure light output.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1A:
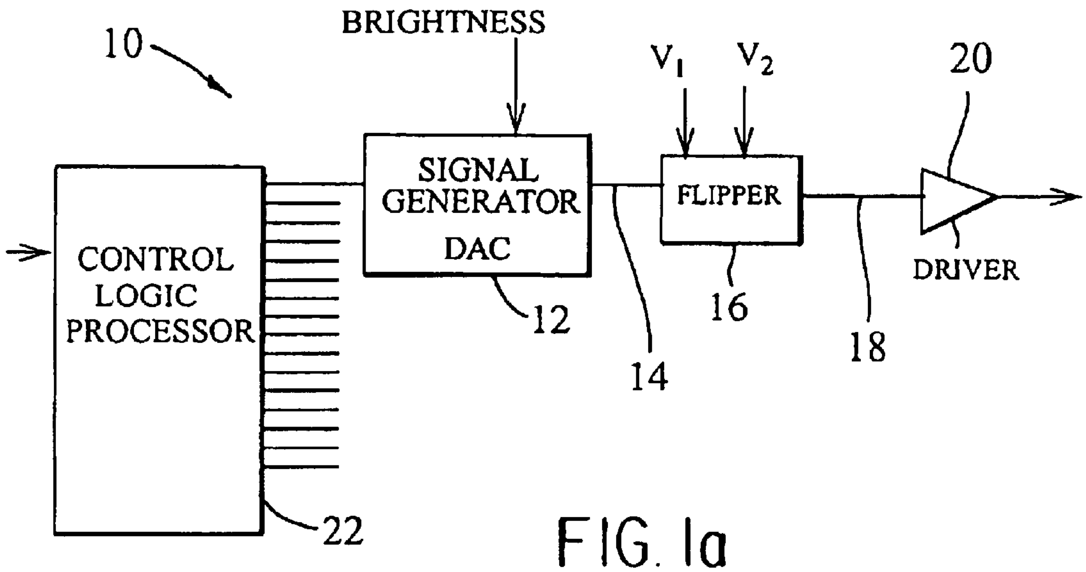
FIG. 1*a* is a schematic block diagram showing key components and signal relationships that apply for a single driver circuit in a multichannel apparatus.
Figure 1B:
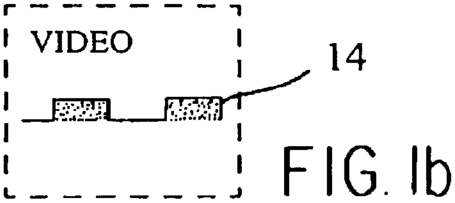
FIG. 1*b* is a diagram showing the video signal from the circuit of FIG. 1*a;*

Referring to FIG. 1*a*, there is shown a simplified block diagram of a single channel driver circuit 10 for a digital projection apparatus, representing the basic components and signals used for a single channel. The function of single channel driver circuit 10 is to provide an image modulation signal for a single pixel in a spatial light modulator (not shown in FIG. 1*a*), an LCD in the preferred embodiment. Each channel has a signal generator 12 such as a Digital-to-Analog Controller (DAC) that accepts a digital input value from a control logic processor 22. The digital input value received is the image data value for the pixel. Signal generator 12 provides a video signal 14 as output, as indicated in FIGS. 1*a* and 1*b*. Video signal 14 is processed by a flipper circuit 16 that also accepts voltages $V_1$ and $V_2$ as alternating black-level video voltages. It is known in the electronic arts that, when driving spatial light modulator devices, it is necessary to periodically alternate the drive voltage polarity, that is, these black-level video voltages, in order to compensate for charge build-up in the device.

Figure 1C:
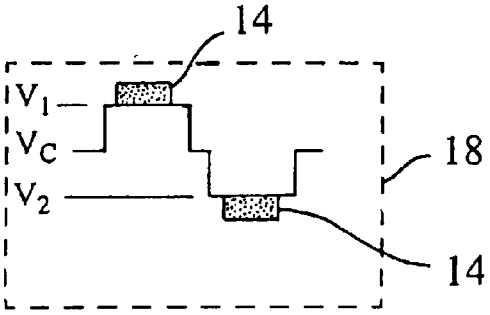
FIG. 1*c* is a diagram showing the combined video signal and positive and negative half-cycle black video signals from the circuit of FIG. 1*a;*

Flipper circuit 16 output is a drive signal 18, as is represented in FIG. 1*c*. Drive signal 18 combines video signal 14 with the alternating $V_1$ and $V_2$ voltages. Thus, signal $V_1$ plus video signal 14 provides the positive half-cycle drive voltage; signal $V_2$ plus an inverted video signal 14 provides the negative half-cycle voltage. Referring back to FIG. 1*a*, a driver amplifier 20 provides drive signal 18 which serves as the input analog signal for a spatial light modulator channel.

FIG. 1*a* is deliberately simplified in order to show overall signal relationships and flow for a single channel. Relative to FIG. 1*a*, the goal of multichannel calibration apparatus of the present invention is to provide calibrated drive signal 18 for each of a plurality of channels. This means that black-level voltage levels $V_1$ and $V_2$ for each channel must be calibrated in order to be essentially the same for each channel. Video signal 14 must provide controllable gain characteristics in order to provide a known output for each pixel. It is instructive to emphasize that signal generator 12 provides output signals for a number of channels at a time. In a preferred embodiment, signal generator 12 provides output signals for 16 channels at a time.

Figure 2:
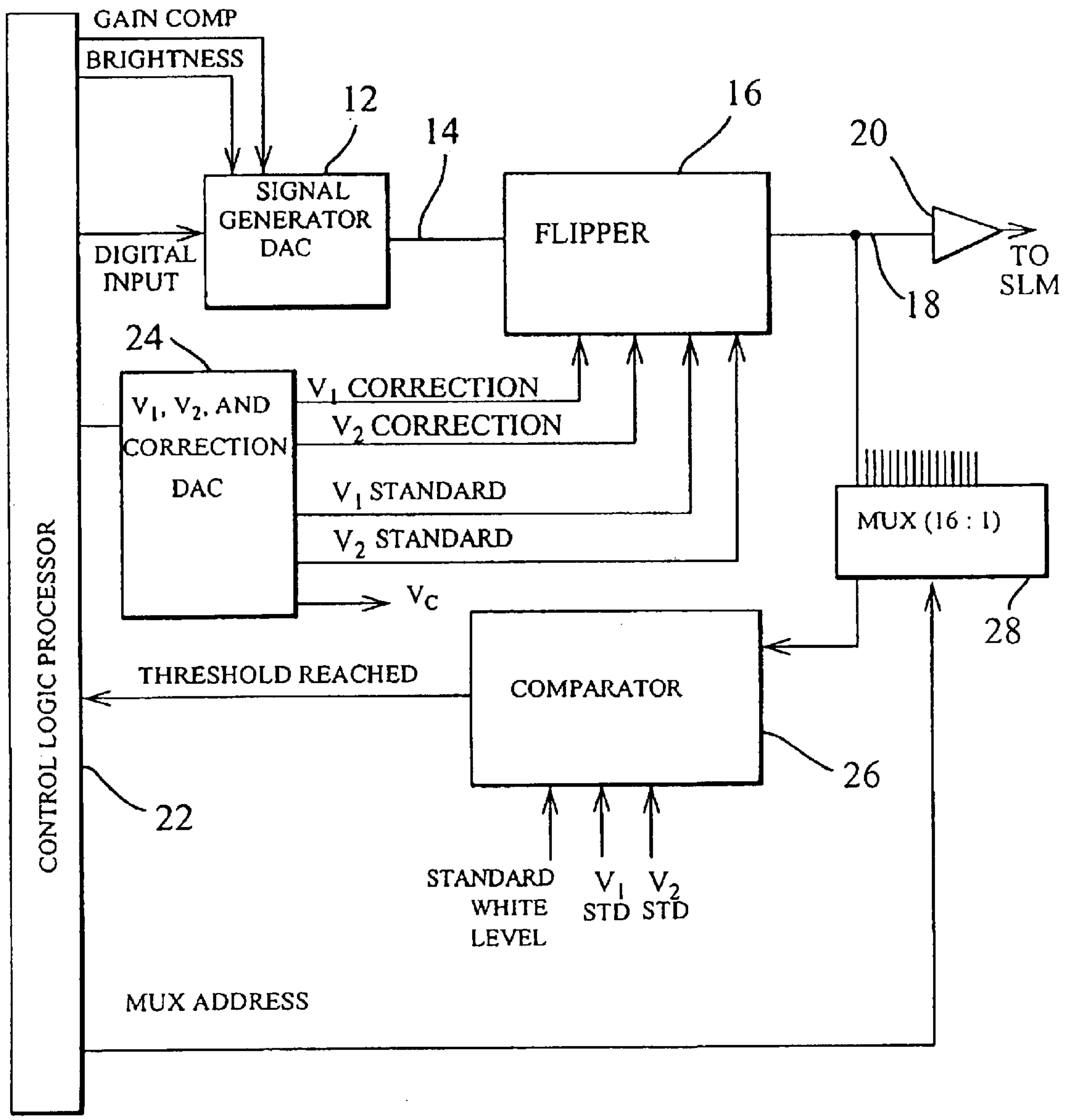
FIG. 2 is a schematic block diagram showing the control loop of the present invention for calibrating each individual driver circuit.

Referring to FIG. 2, there is shown a schematic block diagram of calibration and correction circuitry. Given a digital input value from control logic processor 22, signal generator 12 provides, as output, video signal 14 for the channel to flipper circuit 16. A reference voltage and correction generator DAC 24 provides, as inputs to flipper circuit 16, standard video black-level voltages for all channels, $V_1$ STANDARD and $V_2$ STANDARD. DAC 24 also provides correction voltages $V_1$ CORRECTION and $V_2$ CORRECTION that are computed for each individual channel using the calibration and correction circuitry shown in FIG. 2.

Figure 3:
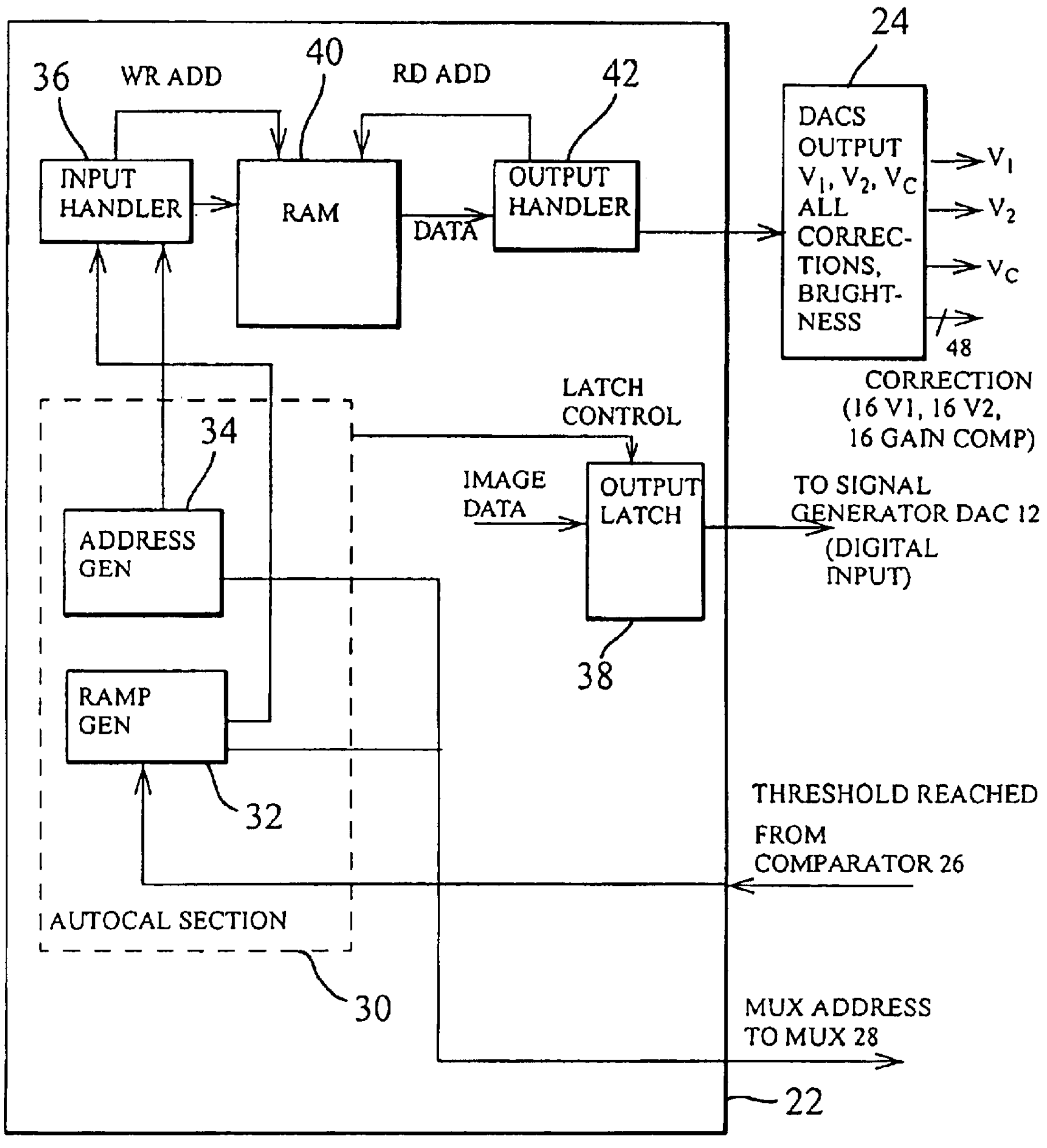
FIG. 3 is a detailed schematic block diagram of control logic components of the multichannel driver circuit of the present invention, showing the functional relationships of components within the control logic processor and the relationship of the control logic processor to the reference signal generator.

Referring to FIG. 3, there is shown a block diagram of key components of control logic processor 22 used for automatic calibration of the present invention. When automatic calibration is initiated, an autocalibration section 30 comprising a ramp generator 32 and an address generator 34 provide address and digital input value data to an input handler 36. Addressing and digital value data are input to a memory 40 which is configured to store digital data values for voltage correction, $V_1$ CORRECTION and $V_2$ CORRECTION, and a digital gain correction value for each individual channel. An output handler 42 reads data from memory 40 and provides the required data values to reference voltage and correction generator DAC 24.

Image data for signal generator 12 is directed through an output latch 38 during imaging operation. During correction voltage calibration, output latch 38 sets its output to zero (hex 000 or 000x) so that signal generator 12 provides no output signal at that time. During gain calibration, output latch 38 sets its output to a maximum value for white-level video (hex FFF or FFFx) in order to provide a video level for gain calibration.

Calibration for Video Black Level

Figure 4:
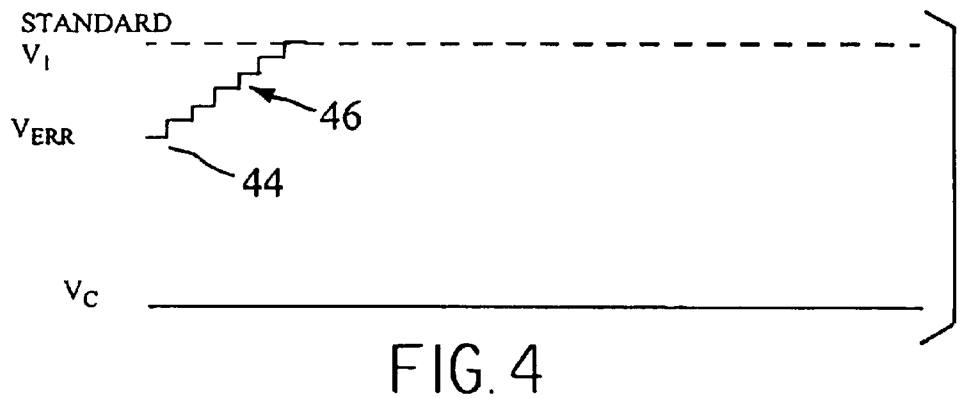
FIG. 4 is a graphical representation of the calibration sequence used for the positive voltage portion of driver circuit operation.
Figure 5:
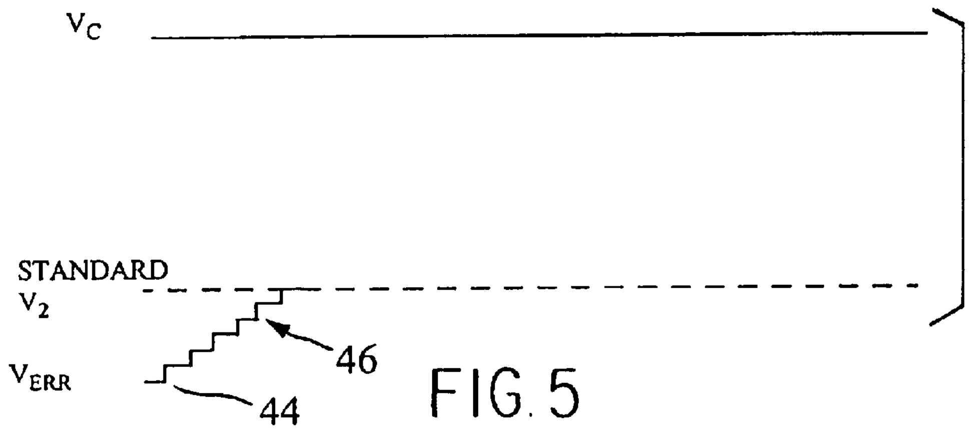
FIG. 5 is a graphical representation of the calibration sequence used for the negative voltage portion of driver circuit operation.

Referring again to FIG. 2, in a special sequence controlled by control logic processor 22 for calibrating each channel, a comparator 26 is provided with standard video black-level voltages $V_1$ STANDARD and $V_2$ STANDARD as a reference. Through a multiplexer 28, which is controlled by a MUX ADDRESS signal from control logic processor 22, comparator 26 is selectively switched to sample each channel individually. There are 16 channels in the preferred embodiment; however, the present invention is applicable for a system using any number of channels. Comparator 26 thereby compares drive signal 18, without added video signal 14, against standard video black-level voltages $V_1$ STANDARD and $V_2$ STANDARD using a ramping sequence, as shown in FIGS. 4 and 5. Referring to FIG. 4, this ramping sequence is shown for comparison against standard video black-level voltage $V_1$ STANDARD. The ramping sequence for standard video black-level voltage $V_2$ STANDARD is similar, with opposite polarity, as shown in FIG. 5.

Figure 7:
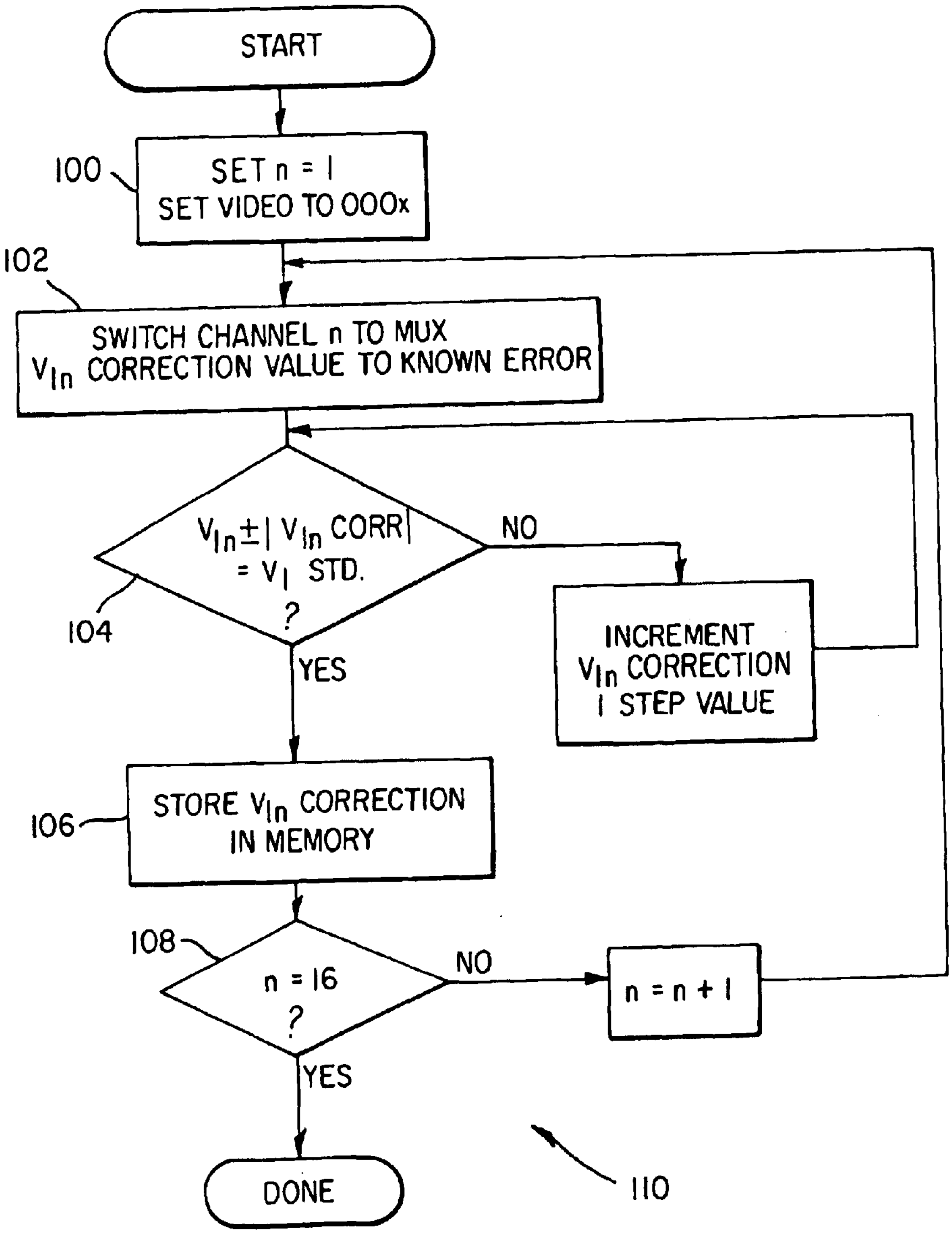
FIG. 7 is a flow diagram showing the process executed by control logic for channel driver calibration.

Referring to FIG. 7, there is shown a logic flow diagram of a black level voltage calibration sequence 110 executed by control logic processor 22 for voltage calibration. Calibration sequence 110 for obtaining correction voltage $V_1$ CORRECTION is shown; a similar sequence is used for $V_2$ CORRECTION, with any required voltage polarity change needed for the negative half-cycle of driver voltage.

At an initialization step 100, a channel counter is initialized, for tracking channel n. Video output from signal generator 12 is set to zero, 000x. In a switching step 102, channel n voltage is set to an initial value 44, $V_{ERR}$ as is shown in FIG. 4. The resultant $V_{ERR}$ voltage for $V_{1n}$ is switched to comparator 26 by multiplexer 28 (FIG. 2). As is represented in FIG. 4, initial value 44 $V_{ERR}$ results from the sum of $V_{1n}$ and $V_{1n}$ CORRECTION voltage, giving a known error value that is below $V_1$ STANDARD. Referring again to FIG. 7, a comparison step 104 evaluates the summed $V_1$ value for channel n, sensed from flipper circuit 16, against the $V_1$ STANDARD voltage. A ramping action, as shown by a signal ramp 46 in FIG. 4, increments the summed $V_1$ value from its initial $V_{ERR}$ value, in increments, until the necessary threshold voltage is reached, that is, when the following equation is satisfied:

$$V_{1n} \pm |V_{1n}\text{CORRECTION}| = V_1\text{STANDARD}$$

At this point, the $V_{1n}$ CORRECTION value can be stored in memory 40 for this channel, during a storage step 106. A looping step 108 assures that a correction voltage value for each channel, $V_{1n}$ CORRECTION, is obtained. As is noted above, the preferred embodiment is for a device having 16 channels; however, the apparatus and method of the present invention could be extended to support devices having any number of channels.

It is instructive to note that the correction voltage $V_{1n}$ CORRECTION could be added to or subtracted from the $V_{1n}$ voltage so that signal ramp 46 could have positive or negative increments for approaching the $V_1$ STANDARD voltage. A preferred embodiment uses the relationship shown in FIG. 4 for $V_1$ and in FIG. 5 for $V_2$.

Calibration for Gain

Figure 6:
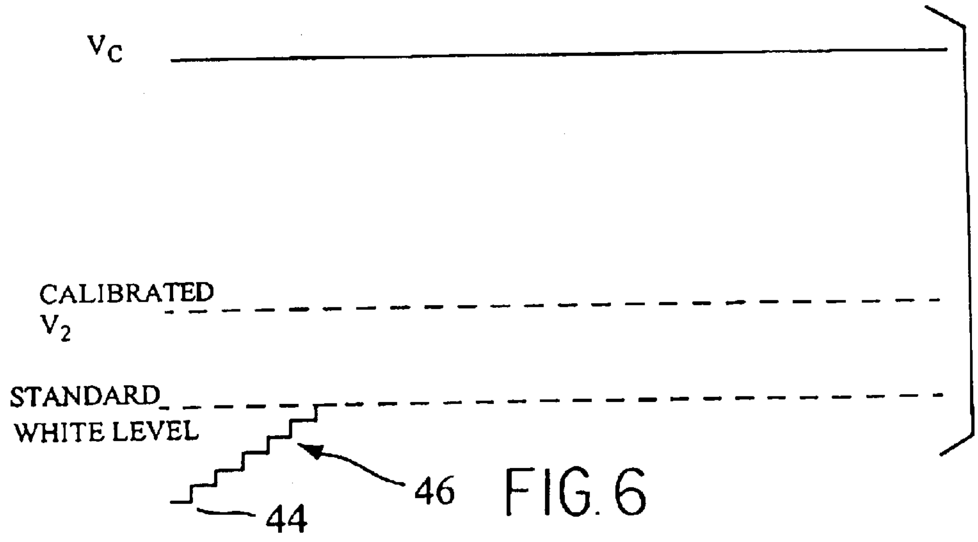
FIG. 6 is a graphical representation of the gain voltage calibration sequence.

In a special sequence controlled by control logic processor 22 to calibrate gain setting for each channel, comparator 26 is provided with a STANDARD WHITE LEVEL voltage as reference. Through multiplexer 28 which is controlled by a MUX ADDRESS signal from control logic processor 22, comparator 26 is selectively switched to sample each channel individually. Signal generator 12 is set to full output value (FFFx in the preferred embodiment) in order to provide a maximum output video signal 14 to flipper circuit 16. Comparator 26 compares drive signal 18 against the STANDARD WHITE LEVEL voltage in a ramping sequence shown in FIG. 6. For this comparison, the negative half-cycle of drive voltage signal is used, with the calibrated $V_2$ voltage serving as a baseline, as is indicated in FIG. 6. The positive half-cycle could alternately be used.

Figure 8:
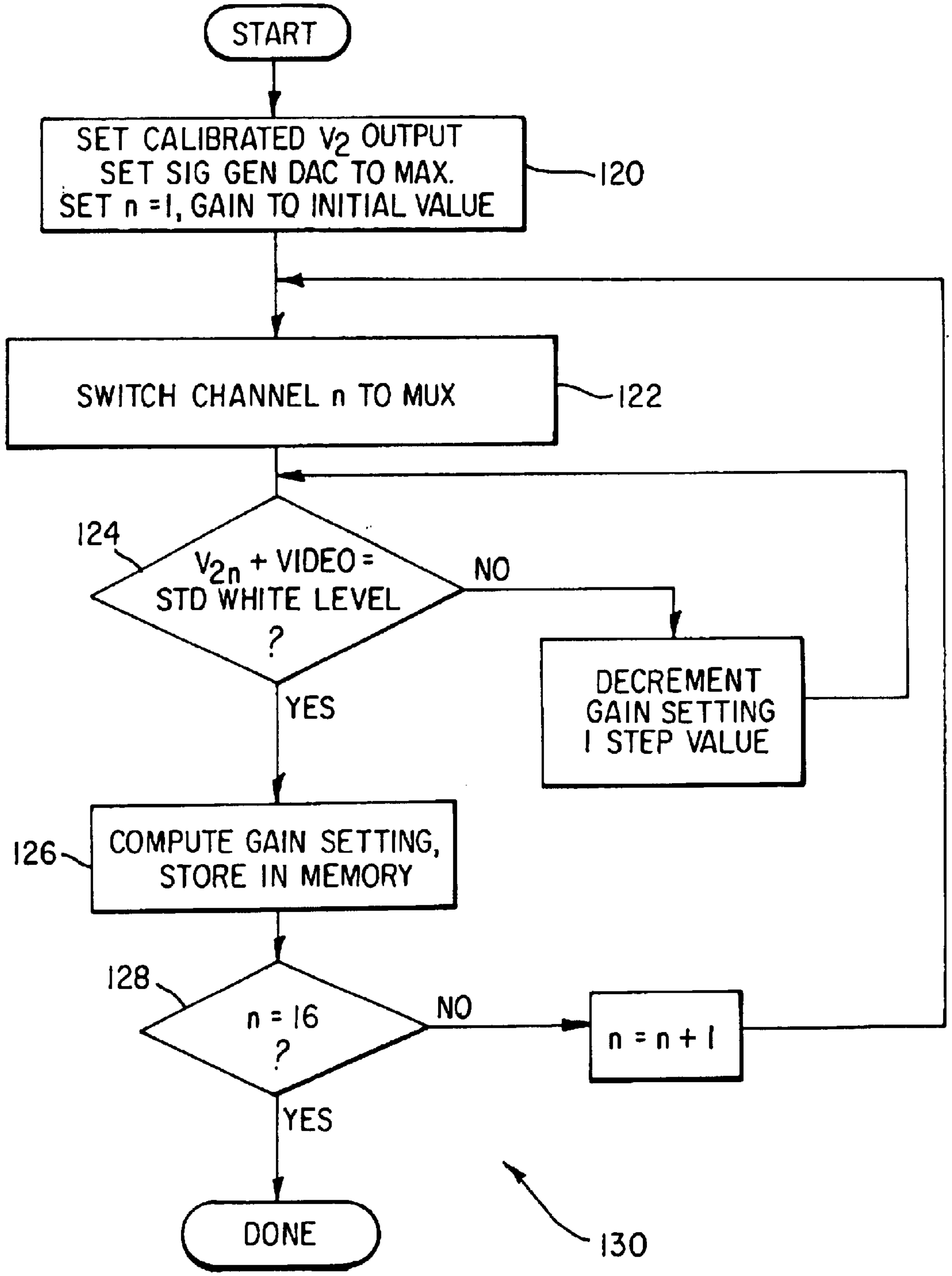
FIG. 8 is a flow diagram showing the process executed by control logic for gain calibration.

Referring to FIG. 8, there is shown a logic flow diagram of a gain calibration sequence 130 executed by control logic processor 22. At an initialization step 120, a channel counter is initialized for tracking a channel n and the gain is set to an initial value. Signal generator 12 output is set to its maximum value, to provide a video signal 14 at a maximum output value. In a switching step 122, channel n is switched by multiplexer 28 to comparator 26. As represented in FIG. 6, initial value 44 for gain correction is set to a value that is known to exceed the absolute value of STANDARD WHITE LEVEL voltage. Referring again to FIG. 8, a comparison step 124 evaluates the summed video output signal against the summed STANDARD WHITE LEVEL and calibrated $V_2$ voltages. A ramping action as indicated by signal ramp 46 is iteratively executed and the summed value compared until the necessary threshold voltage is reached. At this point, the gain response characteristic can be calculated and stored in a storage step 126. A looping step 128 assures that gain correction data for each channel is obtained. As with black level voltage compensation noted above, the preferred embodiment is for a device having 16 channels; the apparatus and method of the present invention could be extended to support devices having any number of channels.

It is instructive to note that, while the preferred embodiment performs gain calibration during the negative half-cycle of the drive voltage signal, the same overall approach would be suitable for gain calibration during the positive half-cycle. Gain compensation need only be obtained over either half-cycle, then applied equally to both half-cycles.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, control logic processor 22 can be implemented using a dedicated microprocessor or other type of device capable of executing a sequence of program instructions, such as a personal computer or workstation. The voltage and gain calibration sequence disclosed could be executed automatically, such as at power-up, or could be initiated based on a command sequence available to an operator. The method and apparatus of the preferred embodiment could be extended to support a spatial light modulator having any number of channels. While most spatial light modulators typically are controlled by drive voltage, a similar approach could be used to equalize drive current on each channel.

Thus, what is provided is an apparatus and method for equalizing drive signals provided over multiple channels to a spatial light modulator.

PARTS LIST

| | |
|---|---|
| 10. | Single channel driver circuit |
| 12. | Signal generator |
| 14. | Video signal |
| 16. | Flipper circuit |
| 18. | Drive signal |
| 20. | Driver amplifier |
| 22. | Control logic processor |
| 24. | Reference voltage and correction generator DAC |
| 26. | Comparator |
| 28. | Multiplexer |
| 30. | Autocalibration section |
| 32. | Ramp generator |
| 34. | Address generator |
| 36. | Input handler |
| 38. | Output latch |
| 40. | Memory |
| 42. | Output handler |
| 44. | Initial value |
| 46. | Signal ramp |
| 100. | Initialization step |
| 102. | Switching step |
| 104. | Comparison step |
| 106. | Storage step |
| 108. | Looping step |
| 110. | Black level voltage calibration sequence |
| 120. | Initialization step |
| 122. | Switching step |
| 124. | Comparison step |
| 126. | Storage step |
| 128. | Looping step |
| 130. | Gain calibration sequence |

What is claimed is:

1. A multichannel driver circuit for controlling each of a plurality of channels of a spatial light modulator, said circuit comprising:

(a) a control logic processor for providing a digital pixel value;

(b) a reference voltage and correction generator that provides as output for all channels a positive half-cycle reference voltage and a negative half-cycle reference voltage, and that provides as output for each channel, based on digital calibration data:

(b1) a gain compensation value;

(b2) a positive half-cycle correction voltage; and, (b3) a negative half-cycle correction voltage;

(c) a channel signal generator for each channel for accepting as input said digital pixel value and said gain compensation value and for providing as output a conditioned gain analog pixel voltage;

(d) a flipper circuit for each channel for accepting as input said conditioned gain analog pixel voltage, said positive half-cycle reference voltage, said positive half-cycle correction voltage, said negative half-cycle reference voltage, and said negative half-cycle correction voltage and for providing as output:

(d1) a positive half-cycle pixel driver output voltage obtained by conditioning said positive half-cycle reference voltage by said positive half-cycle correction voltage and summing the result with said conditioned gain analog pixel voltage;

(d2) a negative half-cycle pixel driver output voltage obtained by conditioning said negative half-cycle reference voltage by said negative half-cycle correction voltage and summing the result with the additive inverse of said conditioned gain analog pixel voltage;

(e) a comparator for performing the following operations for each channel:

(e1) sampling said positive half-cycle pixel driver output voltage from said flipper circuit and providing a first output signal to said control logic processor indicative that said positive half-cycle pixel driver output voltage is substantially equal to said positive half-cycle reference voltage;

(e2) sampling said negative half-cycle pixel driver output voltage from said flipper circuit and providing a second output signal to said control logic processor indicative that said negative half-cycle pixel driver output voltage is substantially equal to said negative half-cycle reference voltage.

2. The apparatus of claim 1 further comprising a multiplexer for switching said positive half-cycle pixel driver output voltage and said negative half-cycle pixel driver output voltage from one of said plurality of channels to said comparator.

3. The apparatus of claim 1 wherein said control logic processor comprises a memory.

4. In an imaging system that uses a spatial light modulator having a plurality of signal channels, an apparatus for obtaining a channel correction signal for calibrating each channel, the apparatus comprising:

(a) for all channels, a standard signal generator for providing a standard reference video black-level signal;

(b) a channel correction signal generator for generating, for each of said plurality of signal channels, a channel correction signal corresponding to a digital input value;

(c) a comparator for comparing a summed signal comprising said channel correction signal and a channel video black-level signal against said standard reference video black-level signal, and for providing a comparator output signal indicative that said summed signal is equal to said standard reference video black-level signal;

(d) a multiplexer for selectively switching said summed signal to said comparator, based on a channel selector signal;

(e) a control logic processor for providing said channel selector signal to said multiplexer, for accepting said comparator output signal, and for executing a control program that obtains said channel correction signal for each channel and stores said channel correction signal in a memory.

5. The apparatus of claim 4 wherein said standard reference video black-level signal is a voltage signal.

6. In an image display apparatus employing a plurality of channel drivers for a spatial light modulator having a plurality of channels, a method for calibration of each individual channel driver, the method comprising:

(a) over the positive half-cycle of a drive signal for said each individual channel, obtaining a positive channel correction signal by iteratively comparing, against a positive standard signal, a positive summed channel driver signal, said positive summed channel driver signal comprising a positive black-video channel driver signal added to a positive channel correction signal, and incrementing said positive channel correction signal until said positive summed channel driver signal equals said positive standard signal, at which time said positive channel correction signal is stored;

(b) over the negative half-cycle of a drive signal for said each individual channel, obtaining a negative channel correction signal by iteratively comparing, against a negative standard signal, a negative summed channel driver signal, said negative summed channel driver signal comprising a negative black-video channel driver signal added to a negative channel correction signal, and incrementing said negative channel correction signal until said negative summed channel driver signal equals said negative standard signal, at which time said negative channel correction signal is stored;

(c) obtaining a gain level by iteratively comparing a channel white-level signal against a standard white-level signal and incrementing a gain signal, until said channel white-level signal equals said standard white-level signal, at which time said gain signal is stored; and (d) wherein said positive channel correction signal, said negative channel correction signal, and said gain signal serve to calibrate said each individual channel driver.

7. The method of claim 6 wherein the step of iteratively comparing said positive summed channel driver signal against said positive standard signal further comprises the step of initially assigning said positive channel correction signal so that said positive summed channel driver signal is not equal to said positive standard signal.

8. The method of claim 6 wherein the step of iteratively comparing said negative summed channel driver signal against said negative standard signal further comprises the step of initially assigning said negative channel correction signal so that said negative summed channel driver signal is not equal to said negative standard signal.

9. The method of claim 6 wherein the step of incrementing said positive channel correction signal comprises the step of adding a negative signal value to said positive channel correction signal.

10. The method of claim 6 wherein the step of incrementing said negative channel correction signal comprises the step of subtracting a positive signal value to said negative channel correction signal.

* * * * *